April 16, 1940.   B. DICK   2,197,126
BRAKING SYSTEM
Filed March 18, 1939
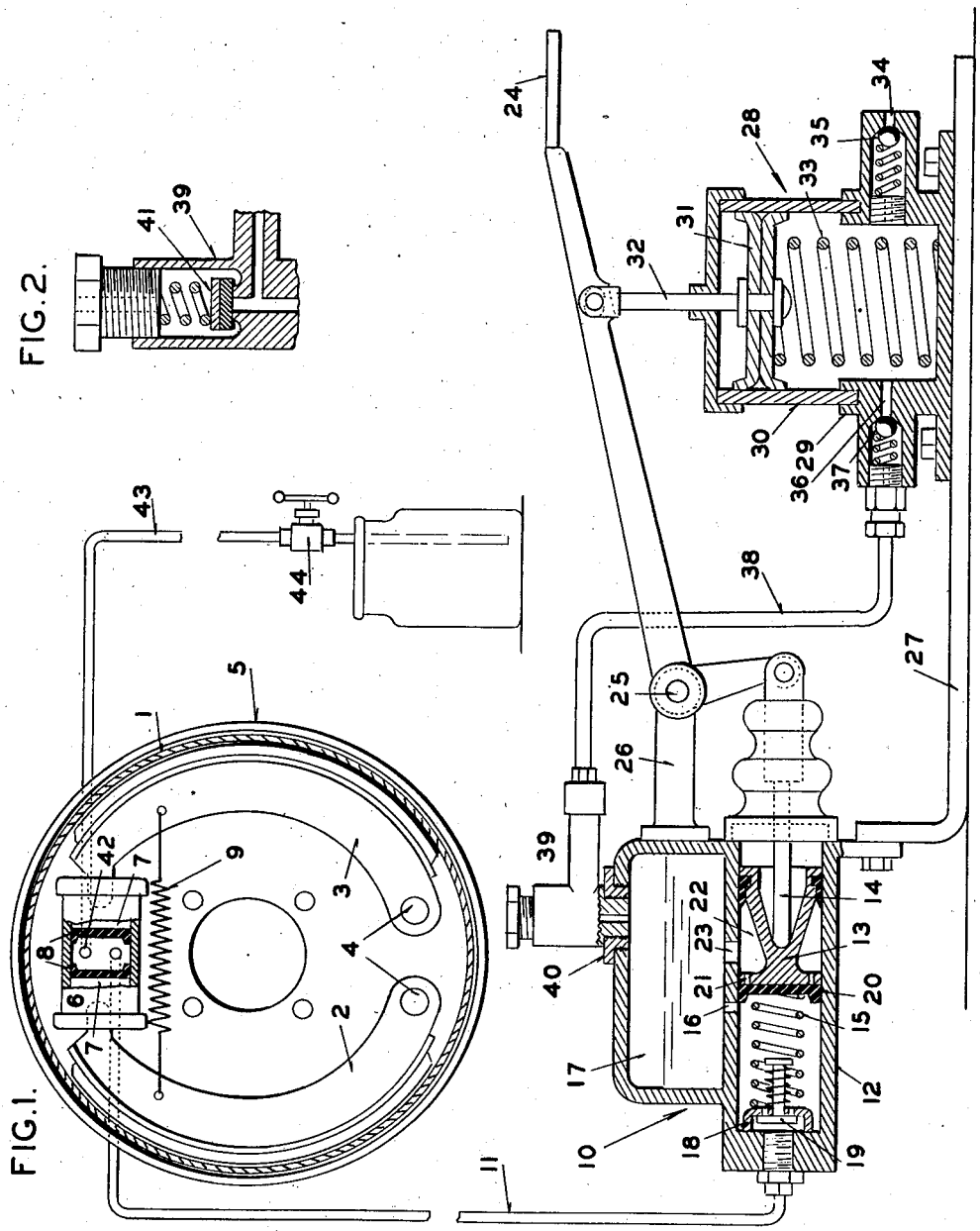
INVENTOR
BURNS DICK
BY E. E. Huffman
ATTORNEY Patented Apr. 16, 1940

2,197,126

UNITED STATES PATENT OFFICE 2,197,126

BRAKING SYSTEM

Burns Dick, Ferguson, Mo., assignor to Wagner Electric Corporation, St. Louis, Mo., a corporation of Delaware Application March 18, 1939, Serial No. 262,629

8 Claims. (Cl. 188—152)

My invention relates to braking apparatus and more particularly to a fluid-actuated braking system for use where it is necessary to have the master cylinder thereof positioned at a lower level than the fluid motor that actuates the brake assembly.

One of the objects of my invention is to provide improved means for maintaining the fluid in the master cylinder reservoir under a pressure greater than atmospheric pressure to thereby prevent the possibility of the fluid in the system from being forced into the reservoir due to the head of fluid in that part of the system above the reservoir.

Another object of my invention is to provide improved means for quickly and efficiently bleeding a fluid pressure actuated brake system which has its fluid-actuated motor positioned remote from the master cylinder and in an inconvenient place.

Other objects of my invention will become apparent from the following description taken in connection with the accompanying drawing in which Figure 1 is a view, partly in section, of a fluid-actuated braking system embodying my invention, and Figure 2 is a cross-sectional view of the relief valve for the reservoir.

Referring to the figures, numeral 1 indicates a brake drum which is fixed to a rotatable member that is to be braked. Within the drum are brake shoes 2 and 3 pivotally anchored by pins 4 to a support or backing plate 5 which encloses the open side of the drum and is fixed to any convenient rigid support. The free ends of the shoes are actuated by a fluid motor 6 mounted on the backing plate, this fluid motor containing two oppositely movable pistons 7 for direct engagement with the shoes. Suitable packing cups 8 cooperate with the pistons. A spring 9 retracts the shoes from the drum.

Fluid under pressure for actuating the fluid motor is created by a master cylinder 10 which is connected to the fluid motor by a conduit 11. The master cylinder construction comprises a cylinder 12 having reciprocable therein a piston 13 operated by means of a piston rod 14. The piston is normally held in a retracted position by means of a spring 15 and when in this position, it uncovers a porthole 16 for placing the reservoir 17 in communication with the system to thereby permit contraction and expansion of the fluid (an incompressible liquid) due to temperature changes and also to replenish any lost fluid. The spring 15 is also employed to hold a valve element 18 seated to prevent fluid from returning to the master cylinder except when this fluid is under a predetermined pressure, say, for example, ten or fifteen pounds per square inch. The valve member 18 also carries a second valve 19 which permits fluid under a very low pressure to flow from the master cylinder to conduit 11 and the fluid motor but not in the opposite direction. The master cylinder piston has associated therewith a packing cup 20 and in order to permit fluid to flow past the periphery of this cup to prevent sub-atmospheric pressure ahead of the piston when piston 13 is retracted, the head of the piston is provided with passages 21 which are in communication with the reservoir by means of an annular chamber 22 in the piston and an opening 23 in the wall of the cylinder.

The brake construction and the fluid pressure brake actuating system described are of well-known construction. When the system is employed to actuate a brake which by necessity must be mounted at a point considerably above the master cylinder, as for example, on an industrial crane or hoist, it has been discovered that the head of fluid may cause some fluid from the fluid motor to flow into the master cylinder. This occurs notwithstanding the fact that the valve 18 is employed to maintain a positive pressure on the fluid in conduit 11 and fluid motor 7 as this valve may not properly seat. This flow of fluid back to the master cylinder is undesirable since it results in air being drawn into the system at the packing cups 8 associated with the pistons 9 of the fluid motor. Of course, it is well known that to have an efficient hydraulic brake system, all air must be excluded from the system otherwise the air which is compressible will result in a "springy" force transmitting column.

In accordance with my invention I provide means for maintaining a constant pressure on the liquid in the reservoir of the master cylinder, which pressure will be above atmospheric pressure. The piston 13 of the master cylinder is operated by means of a foot pedal 24 pivoted at 25 to a member 26 secured to the master cylinder. Beneath the treadle arm of the pedal and mounted upon the same support 27 as the master cylinder is an air pump 28. On the base 29, a cylinder 30 is mounted in which is reciprocable a piston 31 connected by a piston rod 32 to the foot pedal treadle arm. A spring 33 biases the piston and the foot pedal to their normally inoperative positions. The base member 29 is provided with an intake 34 which is controlled by a valve 35 and with an outlet 36 which is controlled by a valve 37. A conduit 38 places the outlet in communication with the top of the reservoir 17 by means of a suitable fitting 39 and a plug 40. This fitting also carries a pop-off valve 41 (Figure 2) for limiting the air pressure which can be placed in the reservoir above the fluid level.

From the foregoing description it is apparent that each time the foot pedal is operated to move the master cylinder piston 13 to actuate the brake, pump 28 will be operated to force air under pressure into the reservoir. If, due to numerous operations of the master cylinder, the air in the reservoir should exceed the desired pressure determined by the pop-off valve, this excess air will be returned to atmosphere. Thus it is seen that the fluid in the reservoir and, therefore, the fluid in the master cylinder ahead of the piston will be maintained under a pressure which is greater than atmosphere, thereby preventing any fluid from flowing back into the master cylinder because of the head of fluid in conduit 11 and the fluid motor. It is also to be noted that my invention permits the use of a pump which is a separate unit from the master cylinder. Thus the same master cylinder can be employed in the combination as is used when it is not necessary to place the liquid in the reservoir under pressure.

Since the brake assembly may be mounted a considerable distance above the master cylinder and also in some inconvenient place, some difficulty may be experienced in bleeding the fluid system to eliminate any air or gases which may be therein. In order to facilitate this bleeding operation, I have shown the usual bleeder opening 42 in the fluid motor as connected to a conduit 43 which extends to a convenient place which can be reached by the operator and which will be the operator's cab when the braking system is used on a crane or hoist. The lower end of the conduit is provided with a valve 44 for opening and closing the conduit. To perform the bleeding operation, all that is necessary is to open this valve 44 and permit the fluid to flow into a suitable receptacle as the air under pressure in the reservoir will force fluid through conduit 11 and the fluid motor. If the air in the reservoir is not under pressure, the bleeding operation can be performed by actuating the foot pedal. When this is done, fluid will be forced through the valve 19 and out through the fluid motor. Fluid will be prevented from returning to the master cylinder by the valve 18 when the piston is retracted and the fluid forced into conduit 11 will be replaced during this retraction of the piston by a flow past the cup 20 from the annular chamber 22.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a braking system having a master cylinder device comprising a cylinder, a piston, a liquid reservoir and means including a single passage for placing the reservoir in two-way communication with the cylinder only when the piston is in retracted position, the combination therewith of an air pump constructed as a separate unit and positioned exterior of the reservoir, a conduit for placing the pump in communication with the reservoir, a pedal, a connection between the pedal and piston, and a second connection between the pedal and the movable element of the pump.

2. In a braking system having a master cylinder device comprising a cylinder, a piston, a liquid reservoir provided with a filler opening in its top and means for placing the reservoir in communication with the cylinder when the piston is in retracted position, the combination therewith of an air pump constructed as a separate unit, a conduit connected to the pump, a fitting for connecting the conduit to the filler opening, a pedal, a connection between the pedal and piston, and a second connection between the pedal and the movable element of the pump.

3. In braking apparatus, a master cylinder device comprising a cylinder, a piston reciprocable therein, a liquid containing reservoir and means including a single passage for placing said reservoir in two-way communication with the cylinder ahead of the only piston when the piston is in retracted position, a brake pedal for reciprocating the piston, an air pump constructed as a separate unit from the master cylinder device and mounted exterior of the reservoir adjacent the pedal, said air pump having a reciprocable element, a conduit connecting the pump with the reservoir above the liquid level, and a connection between the reciprocable element and the treadle arm of the pedal whereby the pump will be operated each time the pedal is actuated to move the master cylinder piston.

4. In braking apparatus, a master cylinder device comprising a cylinder, a piston reciprocable therein, a liquid containing reservoir and means placing said reservoir in communication with the cylinder ahead of the piston when the piston is in retracted position, a brake pedal for reciprocating the piston, an air pump constructed as a separate unit from the master cylinder, means for actuating the pump by the pedal, conduit means for connecting the pump to the reservoir and comprising a fitting connected to the reservoir, and a pressure relief valve carried by the fitting.

5. In a braking system having a master cylinder device comprising a cylinder, a piston, a liquid reservoir provided with a filler opening in its top and means for placing the reservoir in communication with the cylinder when the piston is in retracted position, the combination therewith of a pedal having angularly disposed arms, means for pivotally mounting the pedal on the master cylinder device, an air pump constructed as a separate unit and positioned exterior of the reservoir adjacent the pedal, conduit means for connecting the pump to the filler opening of the reservoir, means for connecting one of the arms of the pedal to the master cylinder piston, and means for connecting the other arm to the pump.

6. In braking apparatus, a master cylinder device comprising a cylinder, a piston reciprocable therein, a liquid containing reservoir and means placing said reservoir in communication with the cylinder ahead of the piston when the piston is in retracted position, means for reciprocating said piston and comprising a brake pedal pivotally mounted on the master cylinder device and having a substantially horizontal treadle arm, an air pump separate from the master cylinder device and positioned beneath the treadle arm, said pump having a vertically positioned cylinder and a piston reciprocable therein, conduit means connecting the pump to the reservoir above the liquid level, and means comprising a rod connecting the pump piston to the treadle arm.

7. In a fluid braking system, a brake assembly provided with an actuating fluid motor, a master cylinder device positioned below said brake assembly, conduit means connecting the master cylinder device and fluid motor, said master cylinder device comprising a cylinder and piston combination and a liquid reservoir in two-way communication with the cylinder only when the piston is in retracted position, means for actuating the piston, an air pump constructed as a separate unit and positioned exterior of the reservoir, conduit means connecting the air pump to the reservoir, and means for actuating the pump by the actuating means for the piston to thereby place air under pressure in the reservoir and the liquid in the reservoir under pressure and prevent the head of liquid from causing a flow of liquid from the fluid motor to the master cylinder reservoir when the piston is in retracted position.

8. In a fluid braking system, a brake assembly provided with an actuating fluid motor, a master cylinder device positioned below said brake assembly, conduit means connecting the master cylinder device and fluid motor, said master cylinder device comprising a cylinder and piston combination and a liquid reservoir in communication with the cylinder when the piston is in retracted position, means for actuating the piston, means for placing the liquid in the reservoir under pressure and comprising a pump connected to the actuating means and operable on each movement thereof, a bleed conduit connected to the fluid motor and extending to a point within access of an operator when on the same level as the master cylinder and out of reach of the brake assembly, and a shut-off valve adjacent the end of the bleed conduit, said air pressure in the reservoir automatically causing liquid to bow through the system from the reservoir when the shut-off valve is open and the master cylinder piston is in retracted position.

BURNS DICK.